US006618772B1

(12) United States Patent
Kao et al.

(10) Patent No.: US 6,618,772 B1
(45) Date of Patent: *Sep. 9, 2003

(54) METHOD AND APPARATUS FOR SELECTING, MONITORING, AND CONTROLLING ELECTRICALLY POWERED DEVICES

(75) Inventors: Kim Y. Kao, 2410 N. Bennett, Tustin, CA (US) 92782; Bruce K. Sauer, Fountain Valley, CA (US); Kent Kwan, Irvine, CA (US)

(73) Assignee: Kim Y. Kao, Newport Beach, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/088,213

(22) Filed: May 29, 1998

Related U.S. Application Data

(63) Continuation-in-part of application No. 08/749,905, filed on Nov. 15, 1996, now Pat. No. 5,901,067.

(51) Int. Cl.[7] ............................................. G06F 13/00
(52) U.S. Cl. .................. 710/15; 710/2; 710/7; 710/17; 710/18; 235/364; 235/375; 235/380; 235/382; 700/11
(58) Field of Search ............................. 710/63, 2, 7, 6, 710/8, 10, 15, 17, 18, 36, 48, 62, 64, 72, 73, 129, 131; 235/381, 375, 376, 382, 383, 364, 380; 364/492; 700/11

(56) References Cited

U.S. PATENT DOCUMENTS

| 3,705,384 A | | 12/1972 | Wahlberg |
| 3,803,491 A | * | 4/1974 | Osborn .................... 455/5.1 |
| 3,828,325 A | * | 8/1974 | Stafford et al. ............... 710/63 |
| 4,053,720 A | * | 10/1977 | Wycheck et al. ............ 379/161 |
| 4,306,293 A | * | 12/1981 | Marathe ..................... 364/557 |
| 4,312,035 A | | 1/1982 | Greene |
| 4,386,400 A | * | 5/1983 | Cope et al. ..................... 710/8 |
| 4,413,211 A | * | 11/1983 | Fowler ........................ 318/257 |
| 4,465,956 A | * | 8/1984 | Fowler ........................ 318/268 |
| 4,481,590 A | * | 11/1984 | Otten ....................... 364/479.14 |
| 4,567,359 A | | 1/1986 | Lockwood |
| 4,583,682 A | * | 4/1986 | Hernandez ................ 236/46 R |
| 4,593,361 A | * | 6/1986 | Otten ...................... 364/479.08 |
| 4,598,378 A | * | 7/1986 | Giacomo ................ 364/479.06 |
| 4,624,578 A | | 11/1986 | Green |
| 4,639,876 A | * | 1/1987 | Deeds ..................... 364/528.11 |
| 4,650,978 A | * | 3/1987 | Hudson et al. ............... 235/380 |
| 4,700,296 A | | 10/1987 | Palmer, Jr. et al. |
| 4,703,412 A | | 10/1987 | Cunningham et al. |
| 4,783,747 A | * | 11/1988 | Komori et al. ......... 364/479.14 |
| 4,808,841 A | | 2/1989 | Ito et al. |
| 4,831,242 A | | 5/1989 | Englehardt et al. |
| 4,902,881 A | | 2/1990 | Janku |
| 4,947,028 A | | 8/1990 | Gorog |
| 5,066,853 A | | 11/1991 | Brisson |
| 5,113,351 A | | 5/1992 | Bostic |
| 5,157,273 A | | 10/1992 | Medendorp et al. |

(List continued on next page.)

Primary Examiner—Thomas Lee
Assistant Examiner—Tammara Peyton
(74) Attorney, Agent, or Firm—Blakely Sokoloff Taylor & Zafman LLP

(57) ABSTRACT

An apparatus for selecting, monitoring, and controlling electrically powered devices is disclosed. In one embodiment, the apparatus includes an electrically powered device having a key operating line and switching control circuitry to control usage of the electrically powered device by interrupting continuity of the key operating line. In another embodiment, the apparatus monitors usage of an electrically powered device. The apparatus includes a circuit which is coupled to the device to provide a power output of the device, an analog to digital converter coupled to receive the power output and convert the same to digital form, and a controller to receive a user input, process the user input by establishing communication with a remotely located device to request approval of a financial transaction, and generate control signals in response to receiving approval. The controller receives the digital form of the power output and monitors the operation of the electrically powered device.

13 Claims, 14 Drawing Sheets

U.S. PATENT DOCUMENTS

| | | | | |
|---|---|---|---|---|
| 5,162,989 A | | 11/1992 | Matsuda | |
| 5,163,124 A | | 11/1992 | Yabe et al. | |
| 5,164,609 A | | 11/1992 | Poppe et al. | |
| 5,187,352 A | * | 2/1993 | Blair et al. | 235/382 |
| 5,198,806 A | | 3/1993 | Lord | |
| 5,206,488 A | | 4/1993 | Teicher | |
| 5,207,784 A | * | 5/1993 | Schwartzendruber | 221/6 |
| 5,278,771 A | | 1/1994 | Nyenya | |
| 5,301,122 A | | 4/1994 | Halpern | |
| 5,347,167 A | | 9/1994 | Singh | |
| 5,359,540 A | | 10/1994 | Ortiz | |
| 5,369,740 A | | 11/1994 | Naylor | |
| 5,393,964 A | | 2/1995 | Hamilton et al. | |
| 5,396,417 A | | 3/1995 | Burks et al. | |
| 5,396,443 A | * | 3/1995 | Mese et al. | 713/321 |
| 5,412,189 A | | 5/1995 | Cragun | |
| 5,424,940 A | * | 6/1995 | Ousborne | 364/140 |
| 5,440,108 A | | 8/1995 | Tran et al. | |
| 5,451,755 A | | 9/1995 | Duval et al. | |
| 5,483,656 A | | 1/1996 | Oprescu et al. | |
| 5,491,326 A | | 2/1996 | Marceau et al. | |
| 5,499,707 A | | 3/1996 | Steury | |
| 5,506,790 A | | 4/1996 | Nguyen | |
| 5,544,138 A | | 8/1996 | Bajorek et al. | |
| 5,572,438 A | | 11/1996 | Ehlers et al. | |
| 5,590,382 A | * | 12/1996 | Kikinis et al. | 710/73 |
| 5,615,105 A | | 3/1997 | Tofigh et al. | |
| 5,619,024 A | * | 4/1997 | Kolls | 235/381 |
| 5,625,669 A | * | 4/1997 | McGregor et al. | 455/418 |
| 5,652,892 A | | 7/1997 | Ugajin | |
| H1708 H | * | 2/1998 | Davidson et al. | 364/479.1 |
| 5,793,629 A | * | 8/1998 | Ishida et al. | 364/131 |
| 5,799,068 A | * | 8/1998 | Kikinis et al. | 379/93.06 |
| 5,799,281 A | * | 8/1998 | Login et al. | 705/1 |
| 5,802,389 A | * | 9/1998 | McNutt | 710/1 |
| 5,812,643 A | * | 9/1998 | Schelberg, Jr. et al. | 379/93.12 |
| 5,845,256 A | * | 12/1998 | Pescitelli et al. | 705/4 |
| 5,898,232 A | | 4/1999 | Reents et al. | |
| 5,925,115 A | * | 7/1999 | Ponte | 710/50 |

\* cited by examiner

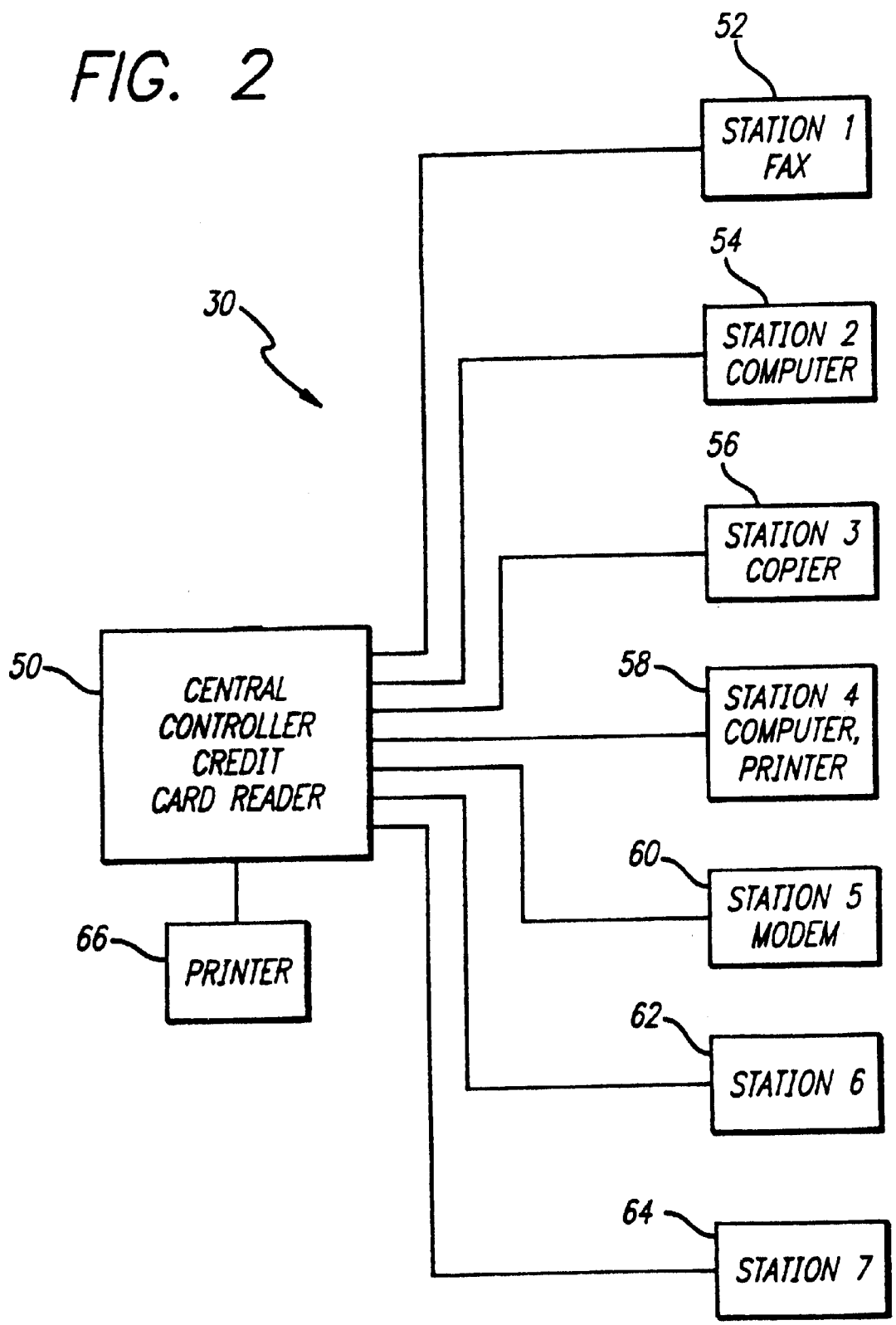

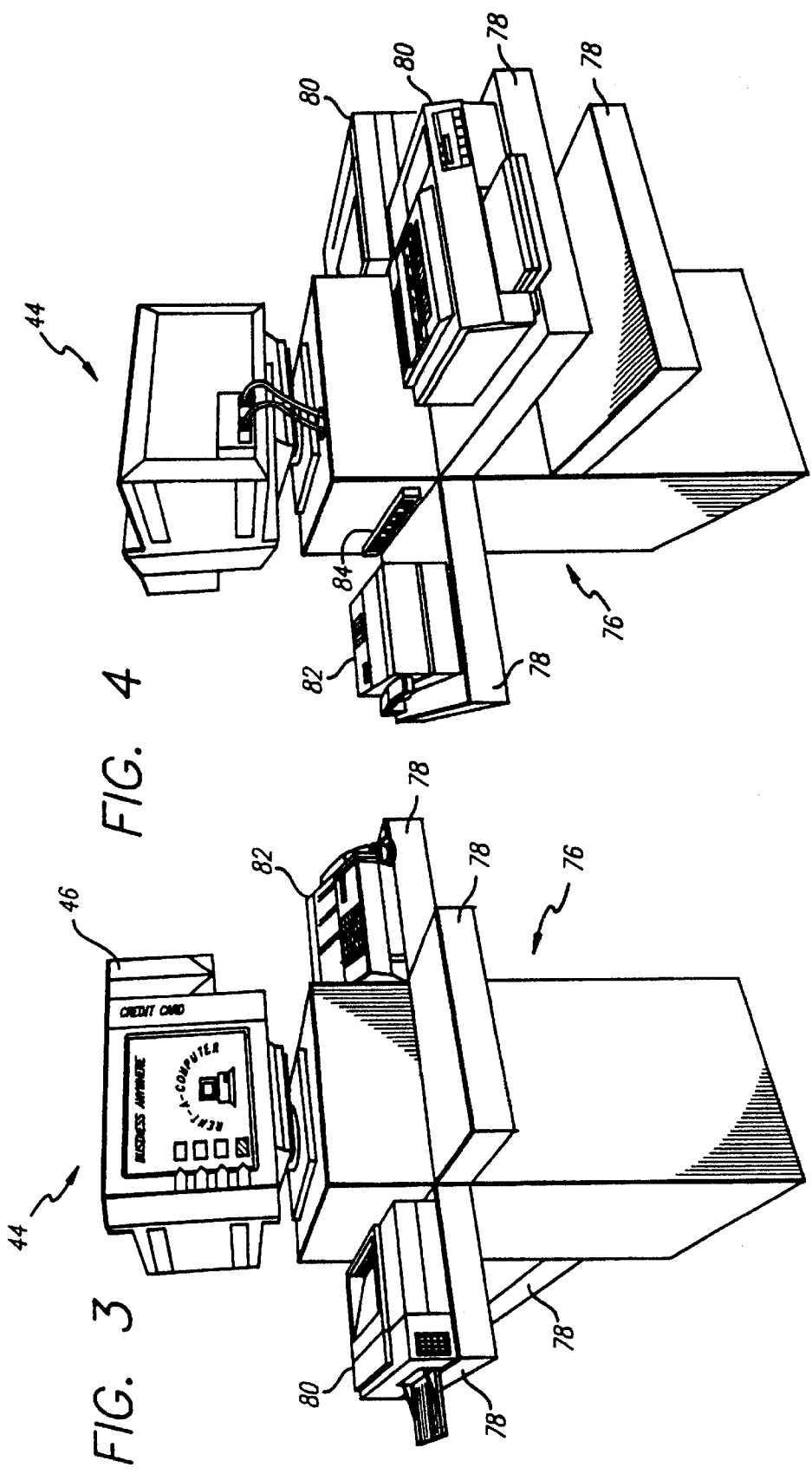

METHOD AND APPARATUS FOR SELECTING, MONITORING, AND CONTROLLING ELECTRICALLY POWERED DEVICES

CROSS-REFERENCES TO RELATED APPLICATIONS

This is a continuation-in-part of a United States patent application entitled "System for Interactively Selecting and Activating Groups of Electrically Powered Devices" filed on Nov. 15, 1996 (application Ser. No. 08/749,905 now U.S. Pat. No. 5,901,067).

BACKGROUND OF THE INVENTION

1. Field of the Invention

The present invention relates generally to a method and apparatus for selecting, monitoring, and controlling electrically powered devices.

2. Background Information

A known approach to monitoring the usage of computers and peripheral devices is through a network. Such an approach to monitoring the status of electrically powered equipment for the purpose of generating billing is deficient in that it is highly complicated, requires bi-directional communications, and cannot readily be adjusted to compensate for changes in the communication interfaces and interface hardware of the monitored devices.

In addition to monitoring usage of computers and computer peripheral devices, it is desirable to be able to remotely activate and deactivate such devices. Current technology employing alternating current ("A/C") lines is deficient in that it does not provide bi-directional feedback.

Known computer rental outlets (e.g., such as Kinkos™) depend upon activation inputs from human employees and, therefore, operate at greater expense. Accordingly, it is also desirable to provide a system which automates the activation and deactivation of electrically powered devices. Although it is known to functionally connect an electrically powered device to a mechanism for receiving payment, the art is devoid of a self-service system which allows multiple users to simultaneously select, activate, and prepay for the use of groups of electrically powered devices.

One method of charging for the use of electrically powered equipment such as a copier or a computer is by the amount of time that the device is used. However, one problem with charging a user based on the amount a device is used is that if such device hangs up, jams, or is otherwise not operating properly, the user will still be charged for the time.

Accordingly, there is a need in the technology for a method and apparatus to automatically monitor and detect an abnormal/catastrophic condition of an electronic device through the usage of power in order to suspend billing of a user's account during the time period which the electronic device is not in proper operation.

It is further desirable to provide a method and apparatus for selecting, monitoring, and controlling electrically powered devices and their internal control circuits.

SUMMARY OF THE INVENTION

In one embodiment, the present invention is an apparatus which includes an electrically powered device having a key operating line and switching control circuitry to control usage of the electrically powered device by interrupting continuity of the key operating line.

BRIEF DESCRIPTION OF THE DRAWINGS

FIG. 2 is a block diagram showing the functional relationship between the central controller and a plurality of stations adapted to receive electrically powered devices.

FIG. 3 is a front perspective view of a stand-alone embodiment of the system for interactively, activating and monitoring the usage of selected computer and computer peripheral devices.

FIG. 4 is a rear perspective view of the system shown in FIG. 3.

DETAILED DESCRIPTION

Figure 1:
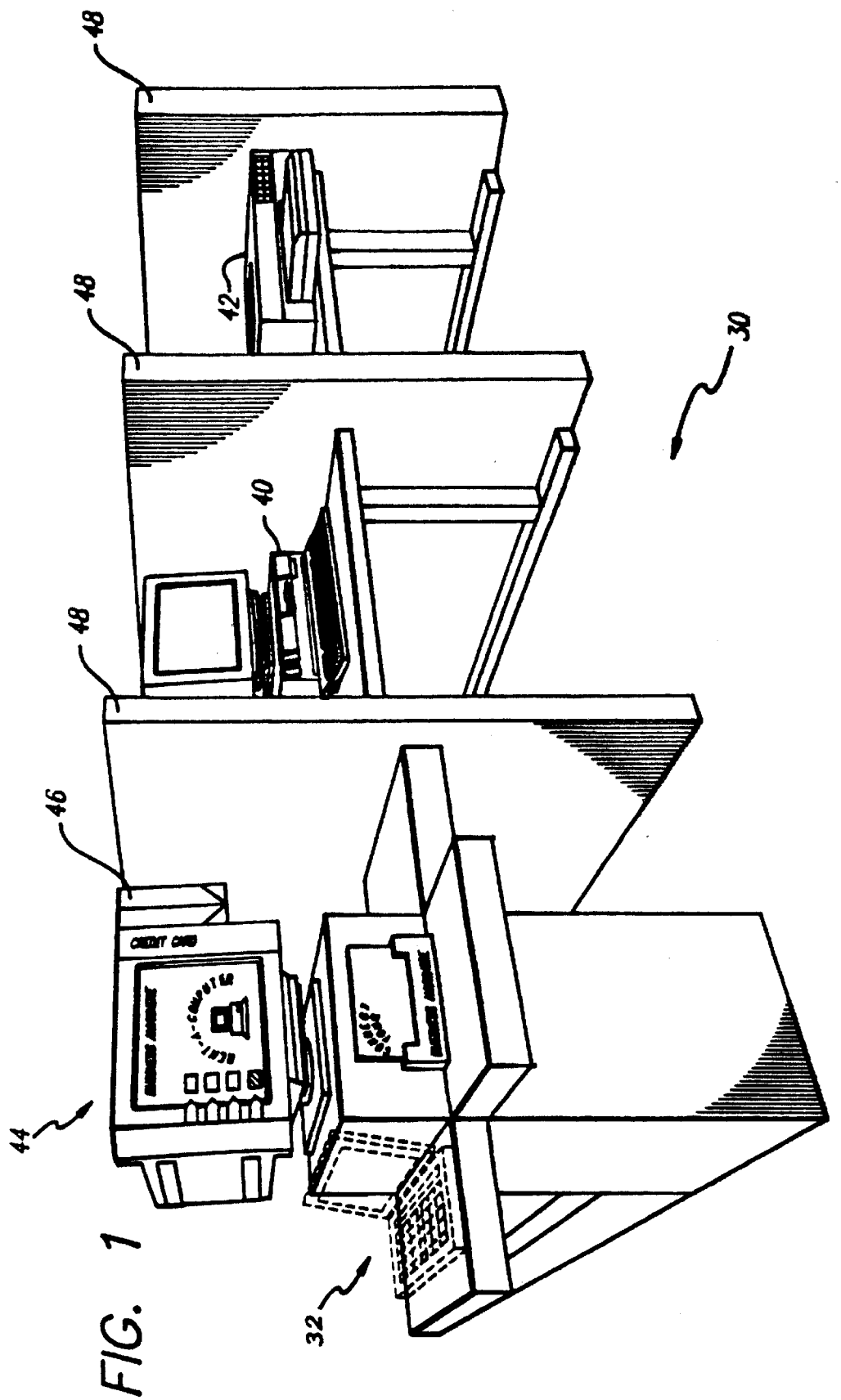
FIG. 1 is a perspective view of a system for interactively selecting, activating and monitoring the usage of groups of computers and computer peripheral devices according to the present invention.

FIG. 1 shows an exemplary system 30 for interactively selecting and activating one or more electrically powered devices. In this embodiment, the system 30 includes one or more computers 40 and/or one or more computer peripheral devices (e.g., printer 42). While the exemplary system 30 includes computers, computer peripherals, and/or other devices typically found in an office, it is contemplated that the one or more electrically powered devices could include appliances such as, for example, a television or coffee maker.

The system 30 additionally includes a display 44 which comprises a video monitor as shown in this embodiment. The system 30 may also include a mechanism for receiving payment, such as, for example, a card reader 46 for obtaining information from a credit card, pre-paid debit card, smart card, membership card, room key, or any other type of card. Alternatively, the mechanism for receiving payment can take another form such as a coin and/or currency receiving mechanism, a biometric recognition system linked to a database of personal or business accounts to verify characteristics of the user (e.g., fingerprint, retinal scan, voice recognition, etc.).

A first key aspect of the present invention is that the system 30 provides its users with a self-service means for selecting and activating particular groups of electrical devices from a plurality of electrical devices. One or several controllers and a switching mechanism are required to implement the system 30. In the exemplary embodiment shown in FIG. 1, the display 44 presents a sequence of menus which interactively prompt a user of the system 30 to provide user inputs which, for example, designate one or more (or a selected group of) devices from a computers 40 and computer peripheral devices 42. At least one of the aforementioned controllers executes a computer executable program or programs for providing user interface control signals to the display 44. The switching mechanism also receives switching control signals generated by execution of a computer executable program by at least one of the controllers. In one embodiment, a computer executable program is also employed to control a means for providing communication links between printer ports and a printer. As discussed below in greater detail, the system 30 may include additional computer executable programs providing communications interfaces to other computers, intelligent peripherals (e.g., payment receiving mechanisms), telecommunications hardware (e.g., telephones, facsimile machines).

Another key aspect of the present invention is that the system 30 also includes interconnection hardware and the communications interfaces necessary for a user to "dock" a personal computer 32 or other electrically powered device to the system 30. As discussed below in greater detail, a controller or processor of the system 30 controls a sequence of interactive visual menus presented at the display 44 thereby allowing the user to select and activate a group of electrically powered devices. More specifically, the user selects a group of "stations" (to which electrically powered devices may be, but are not necessarily, connected). In one embodiment, a "station" is defined as a power outlet that the system 30 is capable of selecting and providing power to, combined with a communications interface that is controlled and accessible by a controller or processor of the system 30. For example, a user may "dock" a notebook style personal computer 32 to the system 30 by selecting the appropriate station at the display 44. The system 30 executes software which applies power to the power outlets of the selected stations and enables the communications interface at the selected stations. The communications interface hardware at the stations comprises connectors facilitating operable connection to currently favored computers and computer peripheral devices.

The system 30 may include redundant computer and computer peripheral devices so that more than one user can simultaneously create, activate and use "custom offices". Accordingly, the system 30 intended to accommodate more than one user can have one or more display 44. The software executed by the system 30 monitors the availability of the computer and peripheral devices and provides a prospective user with an indication that a specified device is unavailable when no such device is currently available for use. As may be readily appreciated, various advanced features may be implemented including, but not limited to, allowing a prospective user to reserve the next available device of a presently unavailable type of electrically powered device. In an embodiment with a payment receiving mechanism 46, the system 30 executes software which allows more than one user to make payment at the same time.

As shown in FIG. 1, the various electrically powered devices may be positioned in distinct areas separated by partition members 48. As may be readily appreciated, the computer and computer peripheral devices may be segregated in a manner which anticipates typically selected combinations of office equipment.

FIG. 2 is a block diagram showing the functional relationship between a central controller 50 and a plurality of stations adapted to receive electrically powered devices. By way of example, the central controller 50 is functionally interconnected to a station 52 and is adapted to provide power and a communication link to a facsimile machine. As shown in FIG. 2, the central controller 50 provides power and communications interfaces to a station 54 which, for example, is adapted to receive a controller interface computer. A station 56 is similarly controlled by the controller 50 which determines when power is made available to a copier and provides a communication link to the copier. A station 58 can, for example, provide power and communications links to an electrically interconnected computer and printer which have been configured to be used together. A station 60 is similarly configured to provide power and communications links to a modem. Additional stations such as stations 62, 64 can also be included in the system 30. The stations 62, 64 allow other computer and computer peripheral devices to be docked to and used with the system 30.

In this embodiment, the central controller 50 additionally supports the system task of determining whether or not payment has been made by a prospective user of the system. For example, the central controller 50 receives inputs from a credit card reader. As shown in FIG. 2, a printer 66 is also electrically connected to the controller 50. The printer 66 may be designated as a dedicated printer which, for example, receives control signals from the central controller 50 and is only used to print receipts for payment or prepayment by the user. In another embodiment, an additional printer (not shown), in addition to or in lieu of printer 66, may be placed at a remote location such as a front desk or cashier's counter for printing receipts, statements, etc. The electrical connection between printer 66 and/or the second printer and the controller 50 may be wired or wireless via radio frequency ("RF") modules.

Figure 9:
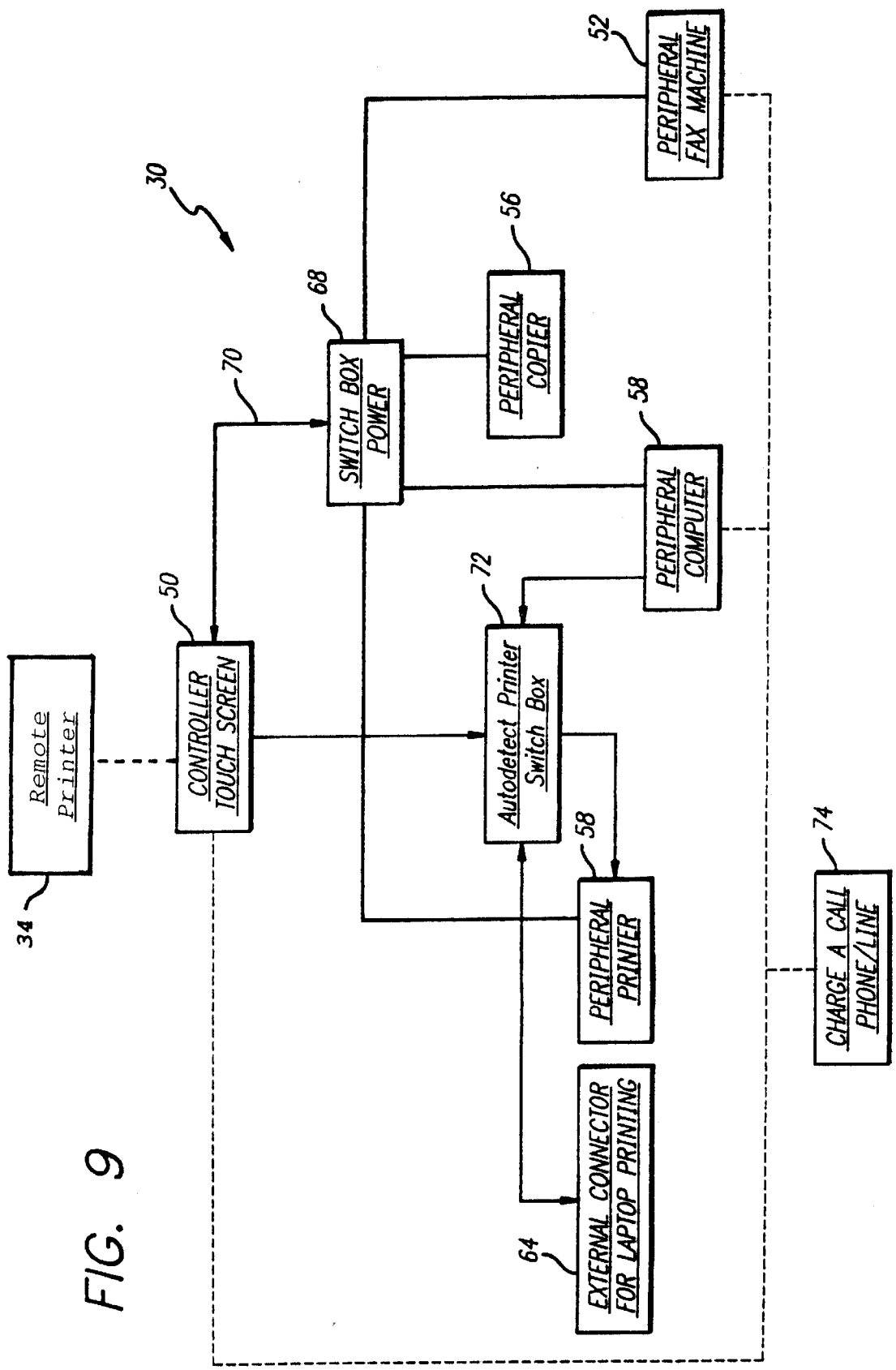
FIG. 9 is a functional block diagram of an alternative embodiment of the system 30.

FIG. 9 is a functional block diagram of an alternative embodiment of the system 30. In this embodiment, the controller 50 provides user interface control signals to a touch screen display. The system 30 also includes a switch box 68 which receives switching control signals from the controller 50 along control signal path 70. It is contemplated that, in another embodiment, the switching control signals from the controller 50 to the switch box 68 may be wireless via RF modules. As shown in FIG. 9, the system 30 also includes a connection link switch box 72 which, for example, selectively provides communication links between one of the printer ports (of the controller 50 and the peripheral computer at station 58) and the peripheral printer at station 58. The operational aspects of the switch boxes 68, 72 are discussed below in greater detail. It should also be appreciated that the two switch boxes 68, 72 can be configured within a single switch box. As discussed above, the controller 50 can also be adapted to support various telephonic data communication interfaces such as a charge-a-call phone line interface 74, a coinless pay phone equivalent.

The system 30 may optionally include a printer 34 located at a secure, remote location such as a front desk of a hotel. In this way, a user may use a room key having a magnetic strip to pay for usage of the system 30, in which case the receipt will be printed at the front desk. The hotel personnel can then add the cost of usage of the system 30 to the user's room bill. Alternatively, the remote printer 34 may be located at a centralized location for billing members who use member cards. These connections made accomplished via wired or wireless methods.

FIG. 3 is a front perspective view of a stand-alone embodiment of the system 30. FIG. 4 is a rear perspective view of the system shown in FIG. 3. The stand-alone version of the system includes a pedestal unit 76 with a plurality of shelves 78 upon which computer peripheral devices are placed. The controller 50 and switch boxes 68, 72 can be physically positioned within the pedestal unit 76 or, alternatively, remotely located. Exemplary computer peripheral devices include laser printers 80 and a facsimile machine 82. As seen in FIG. 4, the system 30 includes a power strip 84 which is electrically connected to and controlled by the switch box 68. Alternatively, the power strip 84 may be positioned within the pedestal unit 76 or at some other location which is not readily accessible by users. Although the stand-alone unit is shown in a kiosk configuration, it should be appreciated that other types of furniture, equipment bays, etc., may be employed particularly if the computers and computer peripheral devices need to be more optimally secured to prevent their theft or attempts by users to manually override control signals from the controller 50. Alternatively, the controller 50 may be operated remotely via conventional networking schemes using the same interface methods. Conventional networking schemes include, for example, the Microsoft™ Windows™ network, Ethernet network, a dial-up modem (e.g., via telephone line), and the like. In addition, the controller 50 may be operated remotely through the Internet.

Figure 5:
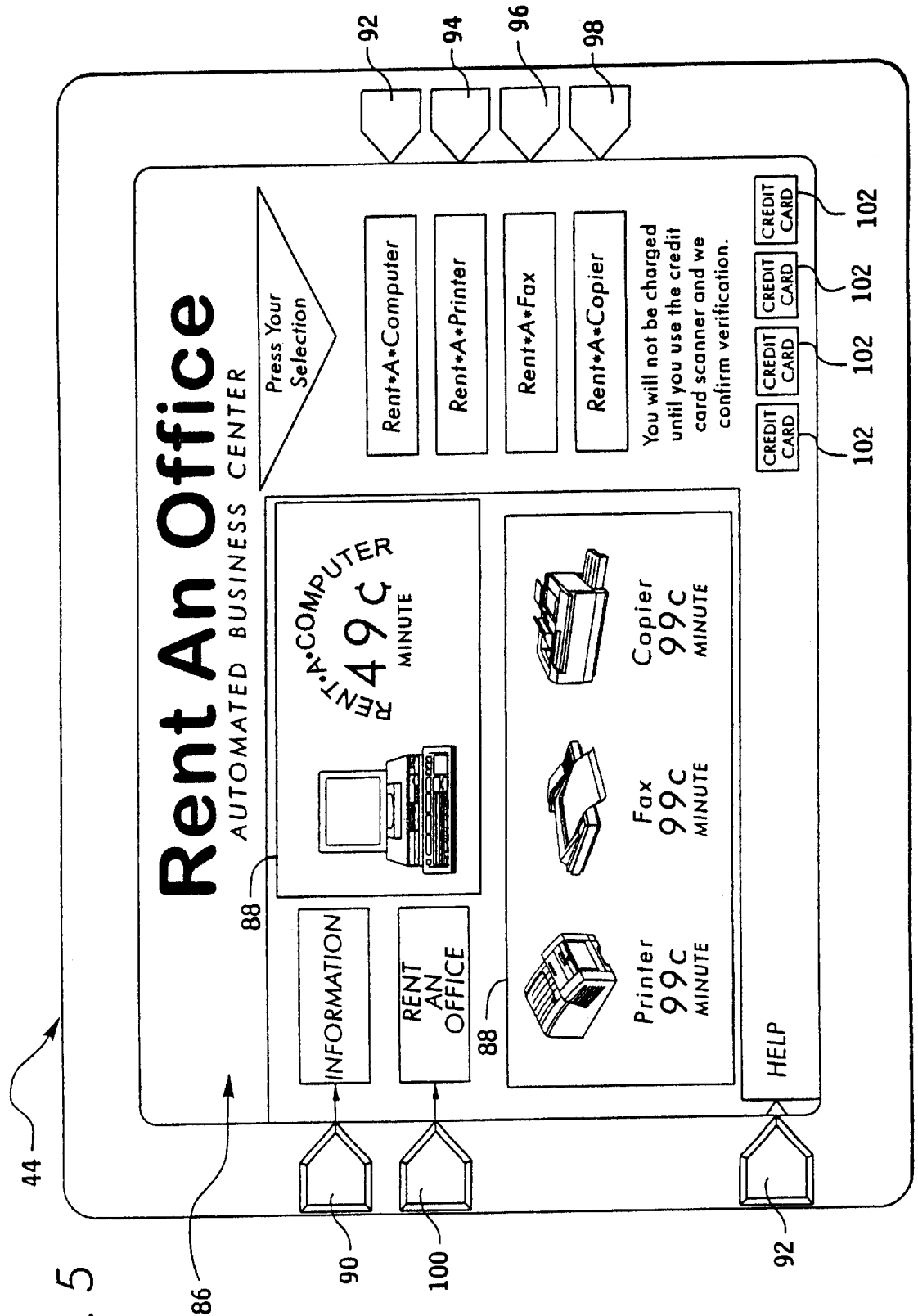
FIG. 5 shows the interactive user interface of the present invention.

As best seen in FIG. 5, an interactive user interface is presented at the display 44. A main menu display 86 is first presented to a prospective user of the system 30. The user interface control signals initiate a sequence of interactive displays. The interactive displays include various fields providing information or facilitating user inputs. One means for receiving user inputs is a touch screen as shown in FIG. 5. Information display fields 88 can, for example, be employed to provide a prospective user with information about the cost per minute for using various computer and computer peripheral devices. An information icon 90 initiates execution of computer executable programs which provide the user with information relevant to selected or indicated aspects of the system 30. Similarly, a help icon 92 is presented to the user and initiates the execution of an executable program or programs which provide a user with additional information explaining how devices are selected, activated, prepayment is made, receipts obtained, etc.

In an exemplary system 30, the available computer and computer peripheral devices include a computer, printer, facsimile machine and copier. These electrically powered devices are respectively selected by pressing device selection icons 92, 94, 96, 98. However, the exemplary system 30 may include other devices such as, for example, a scanner, fax/modem for access to the Internet, etc. The main menu screen 86 additionally includes a device selection icon 100 which, when depressed by a user, initiates activation of a computer, printer, facsimile machine and copier as if all of the device selection icons 92, 94, 96, 98 had been depressed. The main menu screen 86 additionally includes credit card designation icons 102 which facilitate payment or prepayment by the user.

Figure 6A:
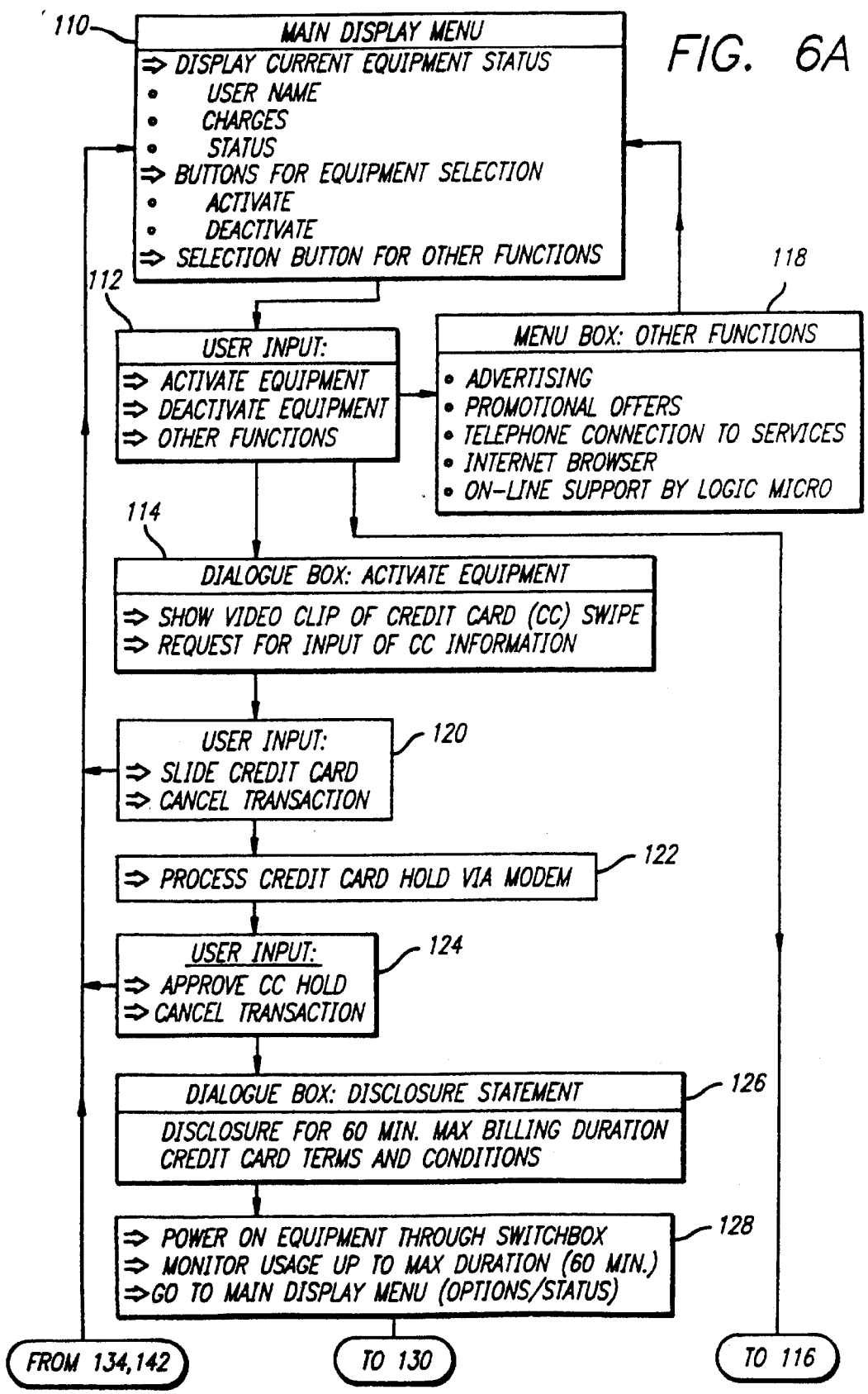
FIGS. 6A and 6B show an operational flowchart of a controller interface software module according to one embodiment of the present invention.
Figure 6B:
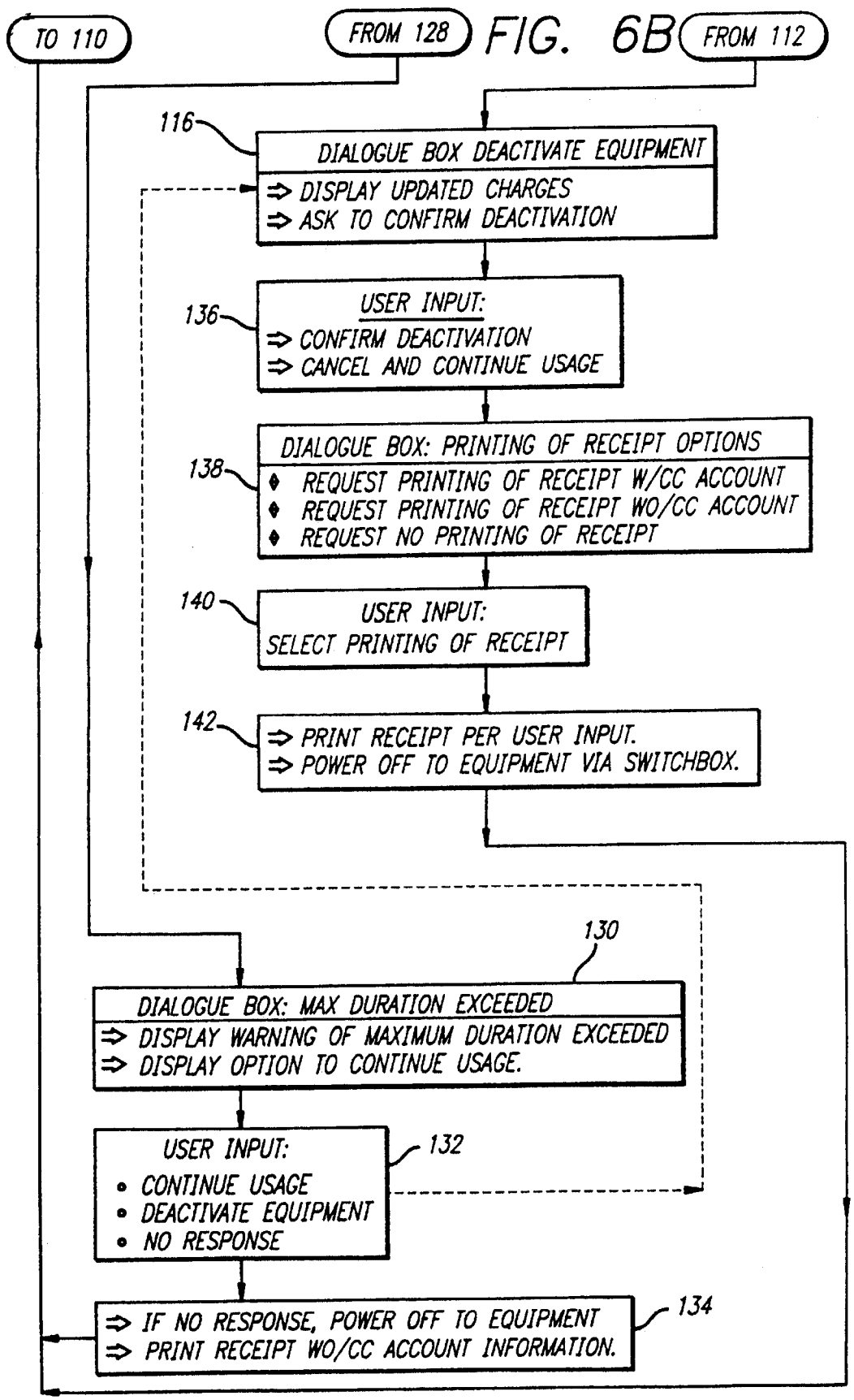

FIGS. 6A and 6B show an operational flowchart of a controller interface software module according to one embodiment of the present invention. A main display menu executable block 110 facilitates the display of currently entered user information, accrued charges and operational status information of the various computer and computer peripheral devices. Additionally, executable block 110 provides for the responsivity of portions of the touch screen for the purpose of selecting electrically powered devices for activation or deactivation.

Executable block 112 responds to user inputs. If the user provides an "activate equipment" input, the executable program is redirected toward executable block 114. If the user provides a "deactivate equipment" input, the executable program is redirected toward executable program block 116 (FIG. 6B). Additionally, a user may provide an "other functions" input. In response to such an input, the executable program is redirected toward executable program block 118 as shown in FIG. 6A. The "other functions" menu block 118 can be programmed to provide a variety of advertising displays, promotional offers and telephone and interconnect connections and services as well as on-line support features.

Another key aspect of the present invention is that the system 30 is configured to operate as a self-service facility. As such, sufficient information must be provided to prospective users. When execution of the "activate equipment" executable block 114 is initiated, a brief video clip illustrating how a credit card is used to prepay is shown to the user. In addition or alternatively, the controller interface computer requests the user to input credit card information such as the account number and expiration date.

As shown in FIG. 6A, the controller 50 processes the next user input at executable block 120 which either receives the credit card information entered or cancels the transaction depending upon the user input. If the transaction is canceled, the executable program is redirected to the "main display menu" executable block 110. If the user elects to continue with the transaction, the executable program is redirected to a "process credit card hold via modem" executable block 122. At a "user input" executable block 124, the user is given an opportunity to approve charging the transaction to the credit card after the transaction has been approved or to cancel the transaction. After a user approves a transaction, a "disclosure statement" executable block 126 controls the display of pertinent limitations and other information to the user. For example, information may be provided to the user that a selected computer or computer peripheral device may only be reserved for up to one hour. Other displays may also be presented such as credit card terms and conditions and disclosures or other information that should or must (required by an applicable law or regulation) be presented to the user.

After the disclosure statement is presented to the user, the executable program is redirected to an executable program block 128 which controls the generation of control signals including switching control signals which are provided to the switch box 68. In one embodiment, the control signals additionally include communication link control signals which, for example, are provided to the switching box 72 to establish communication links between the various electrically powered devices. The executable block 128 additionally monitors usage of the activated computer and computer peripheral devices. The usage is monitored so that the users are appropriately billed after the electrically controlled devices are deactivated and to assure that any predetermined usage limitations such as a maximum time duration are not exceeded.

With reference to FIG. 6B, a "maximum duration exceeded" executable block 130 displays a warning when the maximum duration has been exceeded and, in one embodiment, also displays an option to continue usage. A "user input" executable block 132 redirects the executable program depending upon the user input provided. If the user provides an input indicating a desire to continue using the electrically powered devices, the user is prompted to verify previous inputs and/or provide additional user inputs and the activated devices remain activated or are reactivated as the case may be. As may be readily appreciated, the controller interface software module could also be programmed to provide users with options to add or delete various peripheral devices when a usage session comes to an end or prior to that time. The equipment usage monitoring feature may result in the recordation of the exact amount of time any particular computer or computer peripheral device is activated, round to a nearest minimum time unit (e.g., 10 minutes) or simply bill a user for an amount of time no less than the amount of time reserved and no greater than the maximum amount of time allowed.

If a session comes to an end and a user fails to provide a response, the executable program is redirected toward executable block 134 which generates the appropriate switching control signals to deactivate or disconnect power sources. It should be appreciated that the deactivated power sources are those which are connected to computer and computer peripheral equipment previously activated by the particular user who has failed to respond. The controller software may be programmed to provide the user with a predetermined amount of time to respond (e.g., one minute) before power is removed from the equipment. In the system 30, a usage session is prepaid so that human system attendants are unnecessary. Furthermore, prepayment makes it convenient for a user to rapidly terminate a session and receive a receipt without having to wait for credit card approval, credit line verification or the like. At executable block 134, the receipt is printed without account information to protect a user who is suddenly called away from a usage session.

When a user provides a "deactivate equipment" input, the executable program is directed toward the executable block 116 as shown in FIG. 6B. After the executable block 116 is initiated, the controller 50 calculates and sends control signals facilitating the display of updated charges. The user is also asked to confirm that deactivation is desired. After the user responds to the request for deactivation confirmation, an executable block 136 either confirms deactivation or cancels the request for deactivation and redirects the executable program such that device usage will continue.

Figure 13:
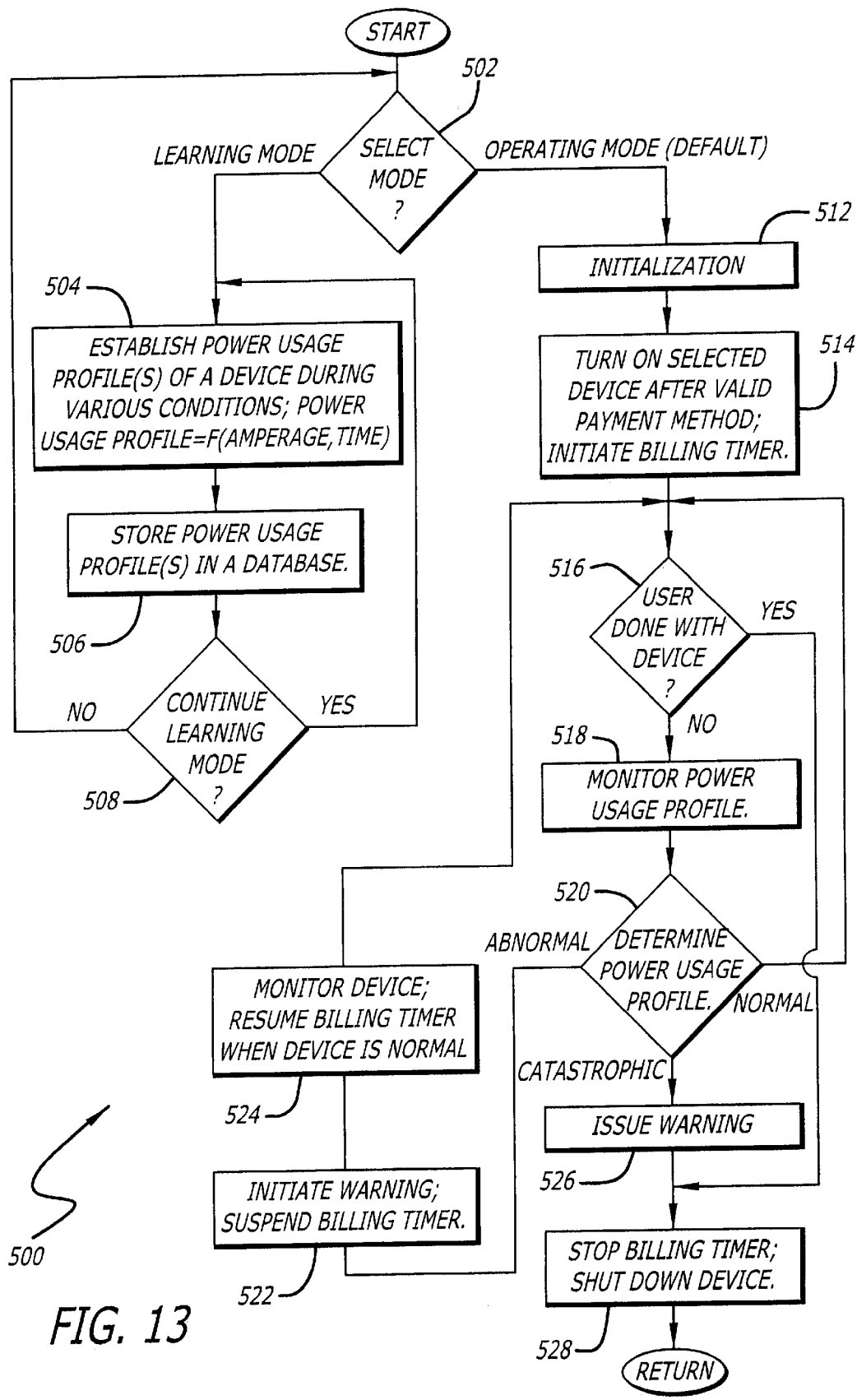
FIG. 13 is a flow diagram illustrating an exemplary process of the software module.

When the user provides an input confirming deactivation, a "printing of receipt options" executable block 138 is initiated. The executable block 138 presents the user with the option of receiving a receipt with or without personal account information or, alternatively, the option of receiving no receipt. The user's response is processed by a "user input" executable block 140 after which the executable program is redirected to an executable block 142 as shown in FIG. 13. The executable block 142 controls the printing of receipts; and thereafter sends control signals to remove power from the appropriate electrically powered devices via the switch box 68.

Figure 7A:
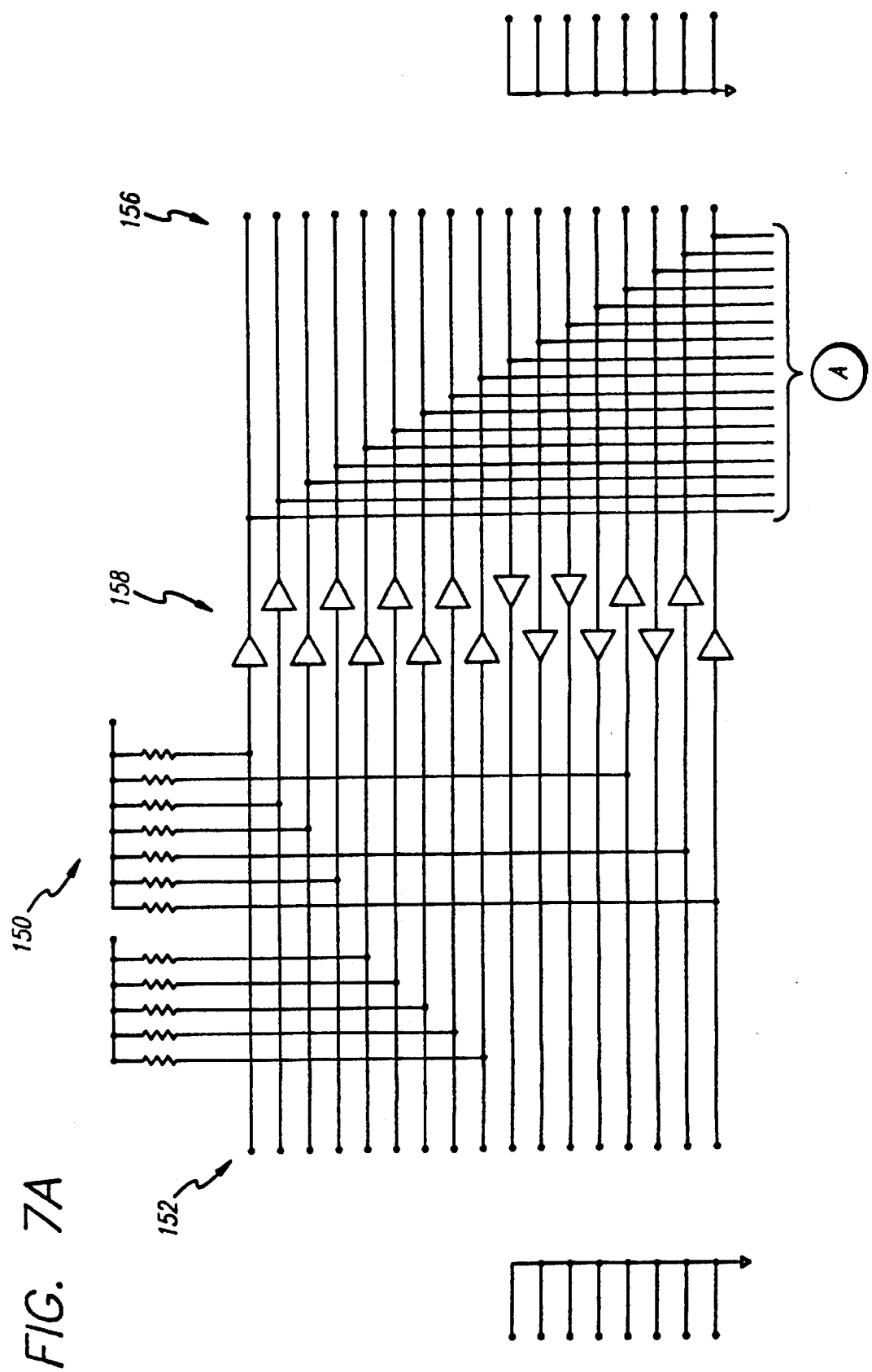
FIGS. 7A and 7B show an electrical schematic of the communication link circuitry of one interactive electrical device selecting and activating system.
Figure 7B:
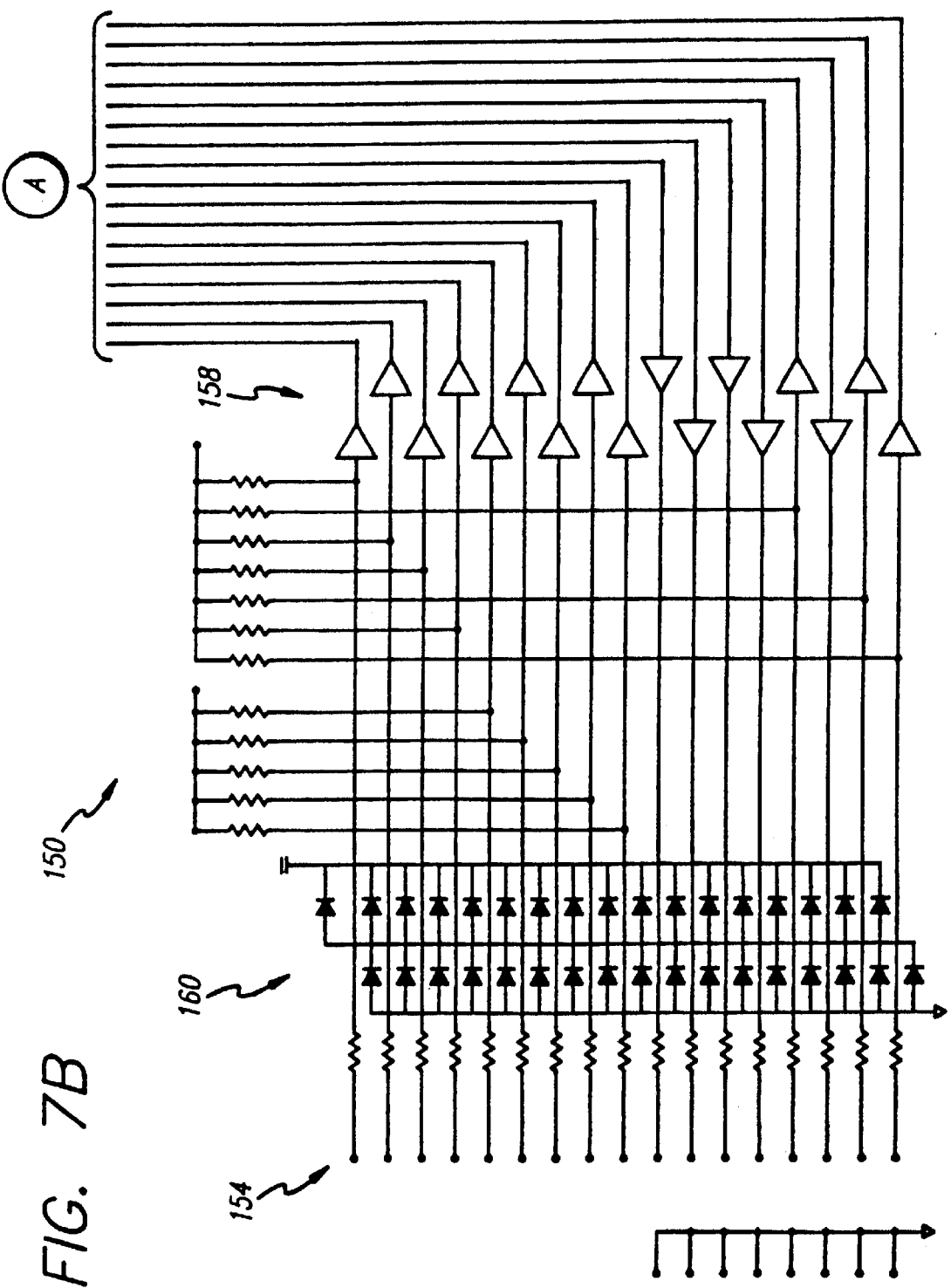

FIGS. 7A and 7B show an electrical schematic of communication link circuitry 150 of a system 30. The communication link circuitry 150 may be, but is not necessarily, located within the switch box 72 (FIG. 9). Generally the communication link circuitry 150 acts as a switch determining which of several communications ports is electrically connected to a peripheral device such as a printer. Referring again to FIG. 9, the controller 50 and the peripheral computer at station 58 both include printer ports. The peripheral printer at station 58 is connected to one of the aforementioned printer ports via the communication link circuitry 150. Parallel printer port connections 152 (FIG. 7A) and parallel printer port connections 154 (FIG. 7B) are respectively connected to two different computers such as the controller 50 and the peripheral computer at station 58 via currently favored connection hardware, e.g., conventional 25-pin D-connectors. Parallel printer port connections 156 (FIG. 7A) are connected, for example, to the peripheral printer at station 58 (FIG. 9). Referring again to FIGS. 7A and 7B, the unidirectional buffer circuitry 158 may be replaced with bi-directional relay circuitry to facilitate bi-directional communications. Referring to FIG. 7B, protection circuitry 160 may also be included.

Figure 8:
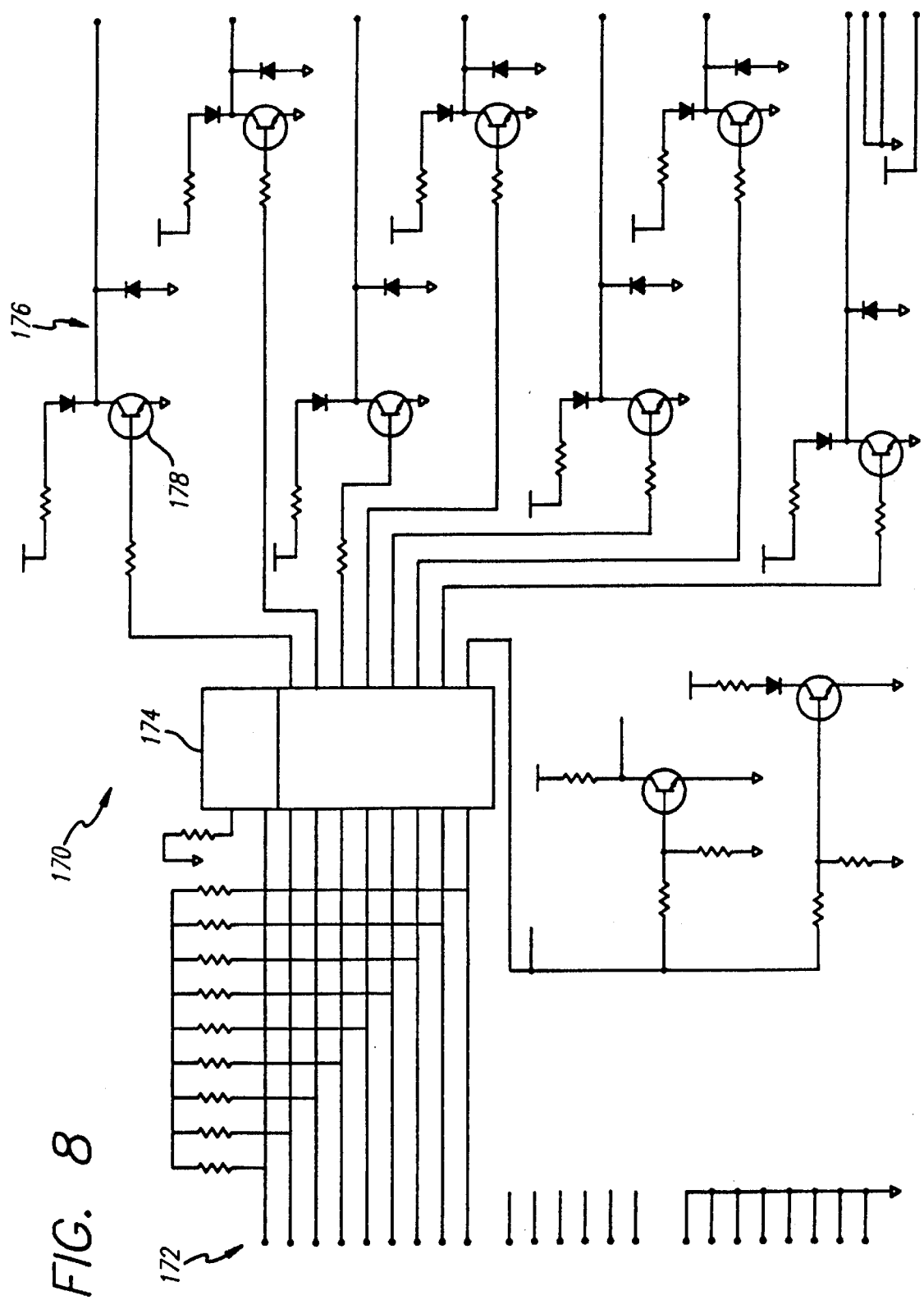
FIG. 8 shows an electrical schematic of the switching control circuitry of one interactive electrical device selecting and activating system.

FIG. 8 shows an electrical schematic of switching control circuitry 170 according to one system 30. Connections 172 are electrically connected to a control port of the controller 50. In one embodiment, 8 bits of data are provided to the connections 172 at a printer port of the controller 50 which has been programmed to function as a control port. The 8 bits of data are provided to a data latch integrated circuit 174 which, for example, comprises a standard 74LS373 integrated circuit chip. The outputs of the data latch integrated circuit 174 are provided to analog transistor circuitry 176 which provide inputs to relays (not shown) for controlling the activation and deactivation of the stations. The individual transistors 178 comprise, for example, a conventional 2N2222 transistor. As shown in FIG. 8, light emitting diodes ("LEDs") may be provided if desired.

Figure 10:
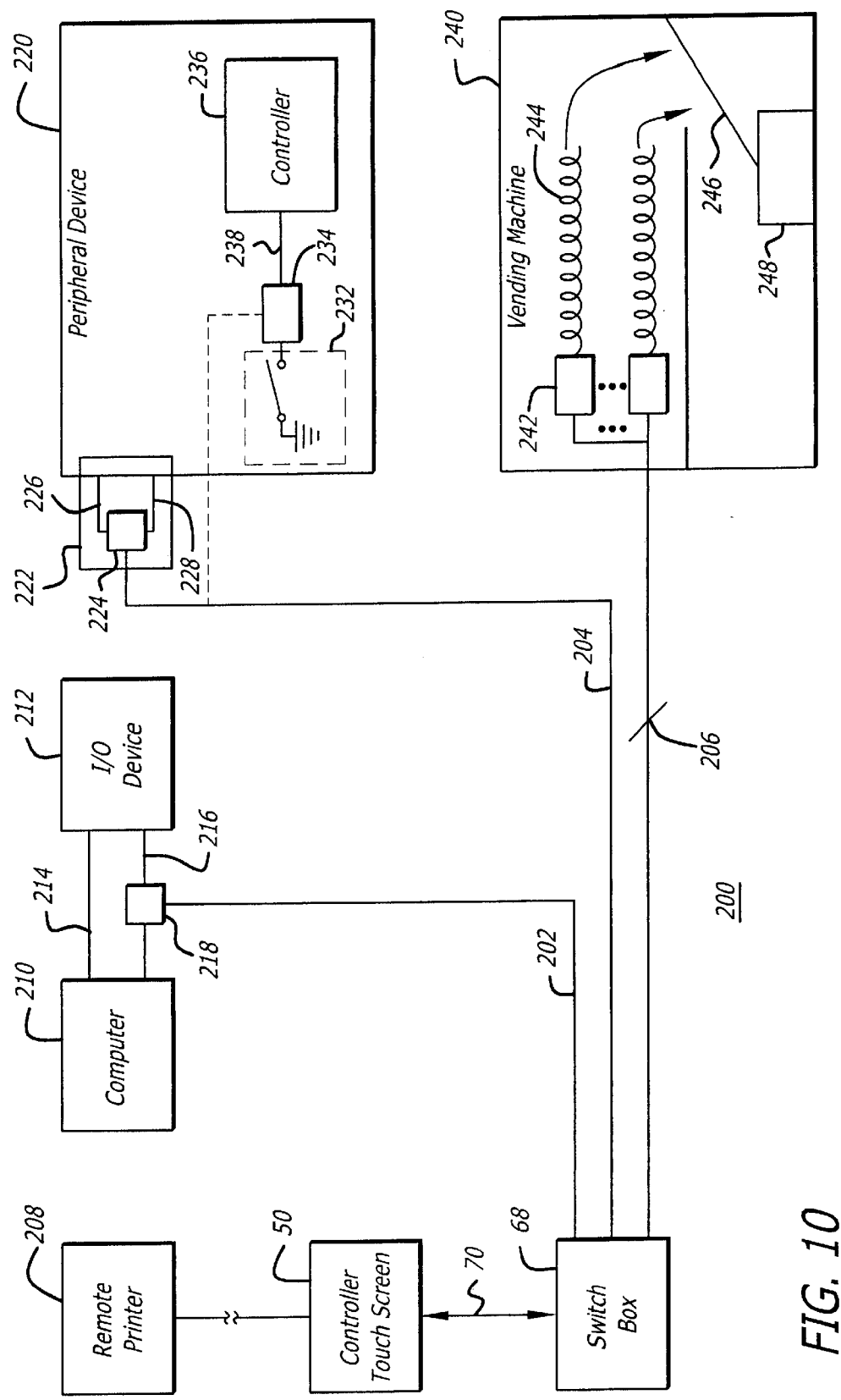
FIG. 10 illustrates a system, in accordance with an alternative implementation of the present invention.

FIG. 10 illustrates a system 200, in accordance with an alternative implementation of the present invention. In this implementation, the system 200 interactively selects and activates key operating control lines of electrically powered devices (e.g., computer and computer peripheral devices) by maintaining or interrupting continuity of such control lines in addition to or in lieu of selecting and activating power to such devices. Referring to FIG. 10, the system 200 includes the touch screen controller 50 which controls the switch box 68 through control signals along control signal path 70. The system 200 further includes a computer 210 which is coupled to and/or controlled by an I/O device 212 through one or more key operating control lines 214 and 216. In general, a key operating control line includes a signal line which may be external or internal to an electrically powered device and controls the functionality of the device, either alone or in combination with other key operating control lines.

For example, the I/O device 212 may be a keyboard with the key operating control line 216 being a power or communication line from the keyboard to the computer 210. The key operating line 216 couples the I/O device 212 to the computer 210 through an activator device 218 (e.g., a relay, combinational logic, etc.). The activator device 218 is controlled by the switch box 68 via communication line 202 which selectively activates/deactivates the activator device 218 for maintaining or interrupting continuity of the key operating line 216 from the I/O device 212 to the computer 210.

It is contemplated that the I/O device 212 may be a mouse, monitor, modem or any other device used for controlling the computer 210 or a peripheral of the computer. For example, at least one activator device 218 may be coupled between a transmit and/or receive line between the computer 210 and a modem to maintain or interrupt continuity of an Internet session. It is further contemplated that the switch box 68 may control more than one I/O device for a single electrically powered device such as a computer. For instance, if a session comes to an end and a user fails to respond, the controller 50 may control the switch box 68 to interrupt continuity of a keyboard, mouse, and/or monitor such that the user is precluded from controlling the computer 210.

In addition or in the alternative, the system 200 controls a peripheral device 220 (e.g., a copier) via communication line 204 by activating/deactivating a control device (e.g., a relay) for maintaining or interrupting continuity of one or more key operating control lines of the peripheral device 220. In one embodiment, a control device 224 is coupled between key operating control lines 226 and 228 of a counter (or "Auditron counter") 222. When activated, the control device 224 provides continuity between key operating control lines 226 and 228 which allows the peripheral device 220 to operate. When deactivated by the switch box 68, the control device 224 interrupts continuity of key operating control lines 226 and 228 which prevents the peripheral device 220 from operating.

Alternatively, a control device 234 may be coupled between a sensor 232 and the input to a controller 236. In this manner, the control device 234 may be controlled by the switch box 68 to mimic the sensor 232. The sensor 232 may be one of a number of key operating sensors of a copier, for example, such as a paper out, toner out, door cover ajar, or paper jam sensor, etc., all of which cause the copier to halt operation. When continuity is to be interrupted, the switch box 68 deactivates the control device 234 to indicate to the microcontroller 236 via key operating control line 238 that there is a halt condition, thereby interrupting the operation of the peripheral device. Through this control mechanism, the continuity of the peripheral device can be maintained or interrupted without cycling power on and off to such device. The advantage of controlling continuity of key operating control lines is that electrically powered devices do not have to be turned off and on.

It is further contemplated that the switch box 68 may control a vending machine 240 via communication lines 206. The vending machine 240 includes a plurality of motors 242 for controlling a corresponding plurality of coils 244 for dispensing various items. A transformer may optionally be placed in between each communication line 206 and each motor 242 in the case of a direct current motor. When a motor is activated by the switch box 68, its corresponding coil initiates a predetermined cycle of rotation to dispense one item. The touch screen controller 50 may execute a controller interface software module for providing a series of menus where a user can select one or more of a number of items from the vending machine 240. The items may include, for example, common "snacks", office supplies (e.g., paper, pen, floppy disk, etc.), and the like.

In an alternative embodiment, the system 30 or the system 200 may be used as a centralized system to control other types of electronically powered devices. For example, the system may be implemented in a Laundromat for centrally controlling washing machines, dryers, etc., in a self-service car wash for centrally controlling car-wash stations, or in an arcade for centrally controlling video games, amusement games, etc.

It is further contemplated that the system 200 may be used to control the usage of software on a selected computer via controlling a software key (hereinafter referred to as a "Dongle"). This mechanism allows a user to be charged on a per-software basis (e.g., for using a word processor, spread sheet program, etc.) rather than a per-computer basis. This can be accomplished, for example, by connecting a Dongle to an I/O port of the computer (e.g., printer port), placing an activator device (e.g., relay) in series with a key operating line of the Dongle, and controlling the relay by the switch box 68. Thus, the controller 50 may control usage of software programs by maintaining and/or interrupting continuity of the Dongle. A script program may be written so that each application software program that is selected by the user first checks the status of a Dongle and, if the relay is activated by the switch box 68 (and the controller 50), indicating that the user has paid to use the software program, the software program executes properly and may be used by the user.

A further aspect of the present invention is an efficient and easy-to-implement method and apparatus for monitoring the status of and controlling such electronic devices. A special circuit is provided which provides measurement of the power (amperage) utilized by each electronic device. By monitoring power usage, the power usage profile of each specific electronic device can be forwarded to the touch screen controller 50. The power usage profiles are then analyzed by software running on the controller 50 to determine the operating status of the electronic device. This may be accomplished by using a standard database of power usage profiles to identify normal type operations and abnormal, catastrophic types of activity exhibited by the electronic devices.

Figure 11:
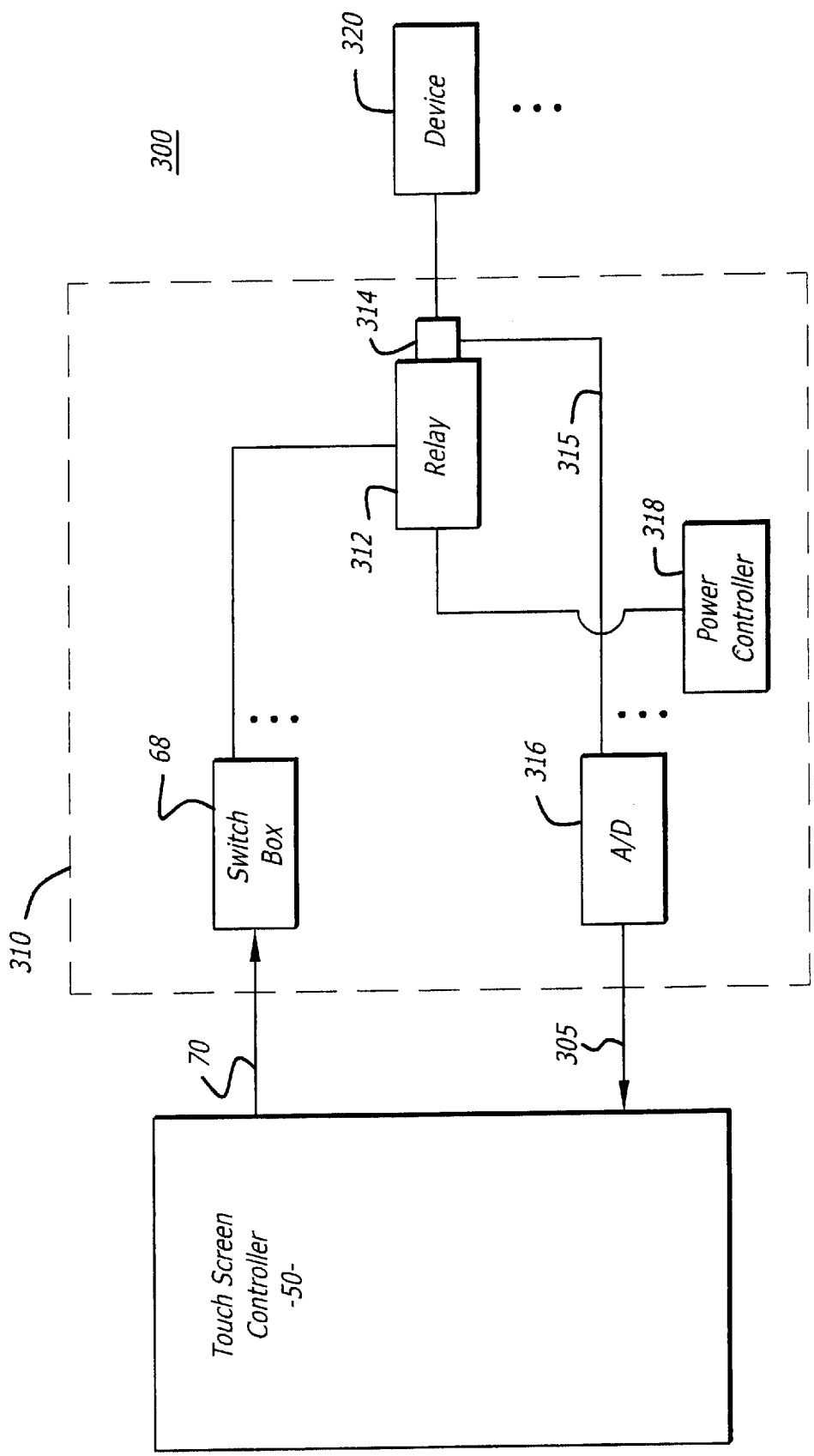
FIG. 11 is a block diagram illustrating one embodiment of a system for monitoring the status of and controlling one or more electrically powered devices.

FIG. 11 is a block diagram illustrating one embodiment of a system 300 for monitoring the status of and controlling one or more electrically powered devices. Referring to FIG. 11, the system 300 includes the touch screen controller 50 which is coupled to the switch box 68 by way of signal path 70 which may be an I/O port, parallel port, etc. The switch box 68 is coupled to a relay 312 for activating and deactivating the same. The relay 312, when activated, couples a power controller 318 (e.g., for supplying A/C power) to an electrically powered device 320 (e.g., computer, copier, fax, and any other electrically powered device). The device 320 is coupled to the relay 312 through a current to voltage converter 314. In one embodiment, the current to voltage converter 314 is an inductive ammeter. The current to voltage converters 314 is also coupled to a channel of an analog to digital ("A/D") converter 316 via signal line 315. In one embodiment, when the relay 312 is activated by the switch box 68, the current to voltage converter 314 outputs a voltage in the millivolt range that corresponds to the power output of the electrically powered devices 320. It is contemplated that the system 300 includes a plurality of such relays and current to voltage converters for monitoring a corresponding plurality of electronically powered devices.

The A/D converter 316 is coupled to the controller 50 by way of signal path 305 (e.g., I/O port, parallel port, etc.). When the device 320 is on (i.e., by activating the relay 312), the power usage of the device is transferred by the current to voltage converter 314 to the A/D converter 316. The A/D converter 316 converts the analog voltage into a digital stream and provides it to the controller 50.

In one embodiment, the switch box 68, relay 312, current to voltage converter 314, A/D converter 316, and the power controller 318 are all contained within an electronic switch box interface 310. In another embodiment, it is contemplated that the A/D converter 316 may be directly coupled to the bus of the controller 50 by way of, for example, a Peripheral Component Interconnect ("PCI") form factor card. The electrically powered devices include, for example, a computer, copier, fax machine, laser printer, other types of peripheral devices, appliances (e.g., coffee maker, rice cooker, television, washing machine, etc.), and the like. In yet another embodiment, the switch box 68 may be replaced with a digital to analog ("D/A") converter which is contained on the same board as the A/D converter 316.

The controller 50 includes a software module that provides the user interface for the operation and use of the system. In addition to recording user requests on the operation of the peripheral devices, the software module also determines the operating status and on/off control to the peripheral devices. The software module further allows the user to specify the time, duration, and conditions within which to turn on/off a selected electrically powered device. The conditions for on/off operations may include specific predetermined time and date, a temperature light sensor, by way of remote control via wireless or telephone access.

The monitoring of the status of an electrically powered device is accomplished by recording and analyzing the digital output from the A/D converter 316 for a particular electrically powered device and comparing it to standard operating profiles for such device. A database of standard operating profiles, representing both regular operating profiles and abnormal/catastrophic (i.e., erroneous) operating profiles, may be maintained in a memory unit (not shown) of the controller 50. The software module continuously monitors the power profiles of the activated devices. If a device exhibits a power profile that represents a catastrophic/halt condition (i.e., a paper jam), the software module suspends charging a user for the time that such device is halted.

A learning mode is provided so that the controller 50 can be adapted to monitoring new electrically powered devices which are plugged into the system. The learning process includes establishing a baseline power consumption and typical operating conditions of the new electrically powered devices. More importantly, abnormal/catastrophic (i.e., erroneous) operating conditions are simulated and recorded onto the database. These power consumption profiles are the basis for the software module to determine the appropriate on/off state for the electrically powered device. The software module includes a user interface which allows programming the on/off of the peripheral devices via user specified conditions. In addition, the software module includes an algorithm which records power utilization profiles and makes comparisons with an established database of power utilization profiles.

Figure 12:
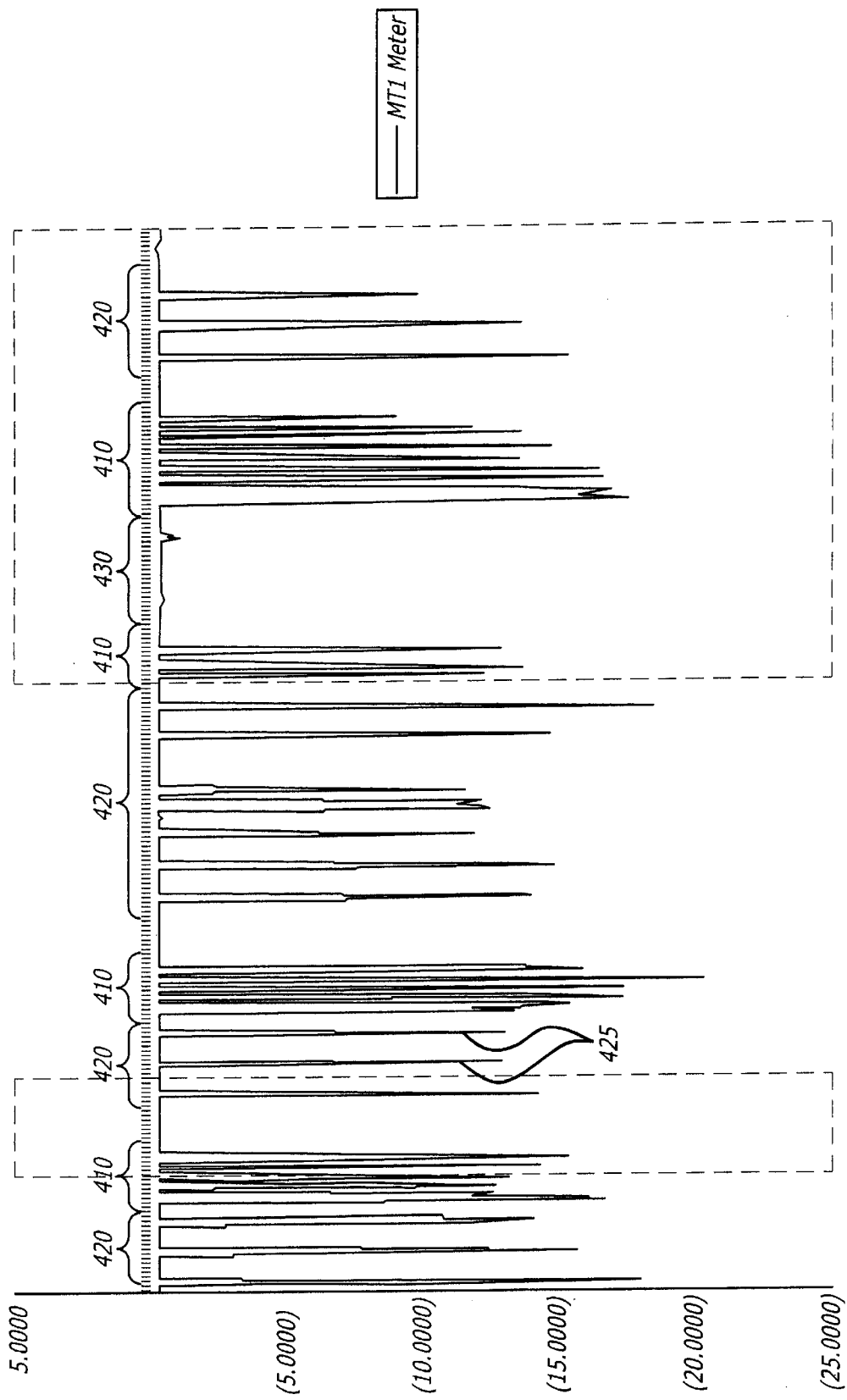
FIG. 12 illustrates an exemplary power profile for a laser printer.

FIG. 12 illustrates an exemplary power profile for a laser printer. Referring to FIG. 12, the power profile shows time periods 410 where the laser printer is printing. At time periods 420, the laser printer is in idle mode, as shown by the periodic spikes 425. At time period 430, the laser printer has a paper jam. During this unique period, the laser printer draws minimal power and has no significant spikes. Thus, if a paper jam occurs, the controller 50 will detect a halt condition by comparing the stored profile in the database with the actual profile of the laser printer or by detecting that the power usage fails to rise above a predetermined threshold for a predetermined time period.

FIG. 13 is a flow diagram illustrating an exemplary process 500 of the software module. Referring to FIG. 13, the process 500 includes a learning mode and an operating mode (default). At block 502 if the learning mode is selected (e.g., during setup of a device by a system administrator), the process proceeds to block 504 where a power usage profile is established for the selected device. In one embodiment, the power usage profile is a function of amperage and time. The power usage profile of the selected device includes, for example, the power usage profile during normal operating conditions, abnormal conditions (e.g., paper jam), and catastrophic conditions. Then at block 506, the power usage profile of the selected device is stored in a database. At block 508, if the learning mode is complete, the process jumps back to block 502, otherwise the process jumps to block 504 for establishing the power usage profile for another device.

At step 502, if the operating mode is selected, the process 500 performs initialization at block 512. Thereafter, at block 514, the process 500 detects a valid method of payment (e.g., a credit card swipe), turns on an electrically powered device selected by the user, and initiates a billing timer. At block 516 a determination is made as to whether the user is done with the usage of the electrically powered device, e.g., by the user pressing an "END" button on a touch screen or the time period selected runs out. If the user is done, the process jumps to block 528 where the billing timer is stopped and power removed to the device or alternatively the continuity of a key operating control line is interrupted.

Conversely, if the user is not done, the process proceeds to block 518 where the power usage is monitored and compared with the stored power usage profile of the device. At step 520, the power usage profile of the device is determined. If the device is in normal operation, the process jumps back up to block 516. If an abnormal condition is detected, the process proceeds to block 522 where billing is suspended and a warning message is displayed. Then, at block 524 the device is monitored and the billing timer is resumed when the device is back to normal condition. The process then jumps to block 516. If at block 520, a catastrophic condition is detected, then the process proceeds to block 526 where a warning message is displayed. The process continues to block 528 where the billing timer is stopped and the device is shut down.

The monitoring of the power usage profile of an electrically powered device provides the advantage of detecting an abnormal/catastrophic operation of the electrically powered device (e.g., when a copier has a paper jam) and automatically suspending billing for usage of that electrically powered device during such abnormal catastrophic condition.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art.

What is claimed is:

1. A system, comprising:
    a plurality of computer and computer peripheral devices including a controller interface computer which executes a controller interface software module to generate control signals including user interface control signals;
    a display responsive to the user interface control signals and adapted to interactively prompt a user to provide user inputs to the controller interface computer, the user inputs including (i) a designation of a selected group of devices from the plurality of computer and computer peripheral devices and (ii) a prepayment method designation; and
    switching control circuitry connected to each of the plurality of computer and computer peripheral devices, the switching control circuitry, responsive to the control signals, to control usage by interrupting continuity of at least one key operating line of one or more of the plurality of the computer and computer peripheral devices.

2. The system of claim 1 wherein the controller interface computer to receive the user inputs, process the user inputs by establishing communication with a remotely located device to request approval of a financial transaction, and generate control signals in response to receiving approval.

3. The system of claim 1 wherein the key operating control line controls the functionality of the one or more computer and computer peripheral devices.

4. The system of claim 1 wherein the controller interface computer may be operated remotely through a network to generate control signals including user interface control signals.

5. The system of claim 1, wherein the plurality of computer and computer peripheral devices includes a single computer and a single computer peripheral device.

6. The system of claim 1, wherein the plurality of computer and computer peripheral devices includes only a plurality of computers.

7. The system of claim 1, wherein the selected group of devices is a single computer.

8. The system of claim 1, wherein the selected group of devices is a computer peripheral device.

9. A system comprising:

a computer;

a computer peripheral device;

a controller interface computer to generate control signals including user interface control signals;

a display responsive to the user interface control signal and adapted to interactively prompt for inputs to the controller interface computer, including (i) a designation of one of the computer and computer peripheral device, and (ii) a prepayment method designation; and switching control circuitry in communication with the computer and the computer peripheral device, the switching control circuitry, responsive to the control signals, to control usage by interrupting continuity of at least one key operating line of the computer and the computer peripheral device.

10. The system of claim 9 wherein the controller interface computer to receive the user inputs, process the user inserts by establishing communication with a remotely located device to request approval of a financial transaction, and generate control signals in response to receiving approval.

11. The system of claim 9, wherein the at least one key operating control line includes a first key operating control line and a second key operating control line.

12. The system of claim 11, wherein the switching circuitry to interrupt continuity of the first key operating control line.

13. The system of claim 11, wherein the switching circuitry to interrupt continuity of the second key operating control line.

* * * * *